(12) United States Patent
Ensberg et al.

(10) Patent No.: US 10,882,220 B1
(45) Date of Patent: Jan. 5, 2021

(54) METHOD AND SYSTEM FOR FABRICATING DUAL CURVATURE MICRO-TRUSS STRUCTURES

(71) Applicant: HRL LABORATORIES, LLC, Malibu, CA (US)

(72) Inventors: Jie Ensberg, Calabasas, CA (US); Christopher J. Ro, Santa Monica, CA (US); Sophia S. Yang, Los Angeles, CA (US); Zak C. Eckel, Calabasas, CA (US); Eric C. Clough, Santa Monica, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 16/256,735

(22) Filed: Jan. 24, 2019

Related U.S. Application Data

(62) Division of application No. 14/824,481, filed on Aug. 12, 2015, now Pat. No. 10,239,237.

(Continued)

(51) Int. Cl.
*B29C 35/08* (2006.01)
*B29C 33/40* (2006.01)
(Continued)

(52) U.S. Cl.
CPC .......... *B29C 33/40* (2013.01); *B29C 33/3842* (2013.01); *B29C 33/60* (2013.01);
(Continued)

(58) Field of Classification Search
None
See application file for complete search history.

(56) References Cited

U.S. PATENT DOCUMENTS

| 3,195,186 A | 7/1965 | Gauban et al. |
| 4,078,959 A | 3/1978 | Palfey et al. |
| (Continued) | | |

OTHER PUBLICATIONS

Truxel et al., "Doubly Curved Composite Sandwich Panels for Hybrid Composite/Metal Ship Structures," Office of Naval Research, Grant No. N00014-05-1-0735, Aug. 15, 2009, 47 pages.

*Primary Examiner* — Monica A Huson
*Assistant Examiner* — Kelsey C Grace
(74) *Attorney, Agent, or Firm* — Lewis Roca Rothgerber Christie, LLP

(57) ABSTRACT

A method and/or system for forming a micro-truss structure in an essentially arbitrary shape. A mold that has a transparent portion, and having an interior volume in the desired shape, is filled with photomonomer resin. The material for the transparent portion of the mold is selected to be a material that is index-matched to the photomonomer resin. The filled mold, placed into a bath of transparent fluid index-matched to the transparent portion of the mold, and illuminated, from outside the fluid, through a photomask, with collimated light. The collimated light travels through the photomask forming beams of light that enter the transparent fluid, propagate into the mold, and form a micro-truss structure in the shape of the interior volume of the mold. The micro-truss structure may then be removed from the mold, or part or all of the mold may be left adhered to the micro-truss structure, forming covering face sheets.

16 Claims, 12 Drawing Sheets

Related U.S. Application Data

(60) Provisional application No. 62/036,911, filed on Aug. 13, 2014.

(51) Int. Cl.
*B29C 33/38* (2006.01)
*B32B 1/02* (2006.01)
*B32B 3/12* (2006.01)
*B29C 33/60* (2006.01)
B29L 31/00 (2006.01)
B29K 105/00 (2006.01)

(52) U.S. Cl.
CPC ............ *B29C 35/0805* (2013.01); *B32B 1/02* (2013.01); *B32B 3/12* (2013.01); B29C 2035/0827 (2013.01); B29K 2105/0002 (2013.01); B29K 2995/0026 (2013.01); B29L 2031/756 (2013.01); B32B 2307/546 (2013.01); B32B 2307/558 (2013.01); B32B 2605/08 (2013.01); B32B 2605/12 (2013.01); B32B 2605/18 (2013.01)

(56) References Cited

U.S. PATENT DOCUMENTS

| | | | |
|---|---|---|---|
| 5,183,623 A | | 2/1993 | Kawaguichi et al. |
| 6,730,244 B1 | | 5/2004 | Lipscomb et al. |
| 8,435,438 B1 | * | 5/2013 | Gross .................... B22F 1/0007 |
| | | | 264/494 |
| 2011/0195361 A1 | * | 8/2011 | Rock ........................ G03F 1/50 |
| | | | 430/322 |

* cited by examiner

METHOD AND SYSTEM FOR FABRICATING DUAL CURVATURE MICRO-TRUSS STRUCTURES

CROSS-REFERENCE TO RELATED APPLICATION(S)

The present application is a divisional of U.S. patent application Ser. No. 14/824,481, filed on Aug. 12, 2015, which claims priority to and the benefit of Provisional Application No. 62/036,911, filed Aug. 13, 2014, entitled "METHOD FOR FABRICATING DUAL CURVATURE MICRO-TRUSS STRUCTURES", the entire contents of both of which are incorporated herein by reference.

The present application is related to U.S. Pat. No. 7,382,959 ("the '959 patent") and U.S. Pat. No. 7,938,989 ("the '989 patent"), the entire contents of both of which are incorporated herein by reference.

FIELD

The following description relates to the fabrication of open-celled composite structures and more particularly to a method of forming micro-truss structures in a variety of shapes.

BACKGROUND

Lightweight structures such a honeycomb or open-cell foam are utilized in a wide variety of applications, to provide structural support, impact protection, or the like. For example such materials may be used to fill space and provide structural support in automobile dashboards, aircraft wings or boat hulls. Micro-truss structures, such as those described in the '959 patent and the '989 patent, are also open cellular structures. Forming a flat sheet of, e.g., foam, honeycomb, or micro-truss material into a curved shape to conform, e.g., to the interior of a wing or dashboard may be an expensive and/or destructive process. Thus, there is a need for a method and/or system for fabricating an open-cellular material, such as a micro-truss material, into an object with a curved outer surface.

SUMMARY

Aspects of embodiments of the present disclosure are directed toward a method and/or system for forming a microtruss structure in an essentially arbitrary shape. A mold that is transparent or has a transparent portion, and having an interior volume in the desired shape, is filled with photomonomer resin. The material for the transparent portion of the mold is selected to be a material that is index of refraction matched with the photomonomer resin. The filled mold, placed into a bath of transparent fluid index of refraction matched with the transparent portion of the mold, and illuminated, from outside the fluid, through a photomask, with collimated light. During the illumination, the mold is oriented so that a transparent portion of the mold is facing in the direction of the photomask. The collimated light travels through the photomask forming beams of light that enter the transparent fluid, propagate into the mold, and form a micro-truss structure in the shape of the interior volume of the mold. The micro-truss structure may then be removed from the mold, or part or all of the mold may be left adhered to the micro-truss structure, forming covering face sheets.

According to an embodiment of the present invention there is provided a method for fabricating a micro-truss object, the method including: assembling: a reservoir; a volume of a photomonomer resin; a mold having an interior volume, the mold including a first portion including an index-matched mold material that is index of refraction matched with the photomonomer resin; a volume of an index-matched fluid that is index of refraction matched with the index-matched mold material; and a photomask; the mold enclosing the volume of the photomonomer resin; and the volume of the index-matched fluid being inside the reservoir; the mold being at least partially submerged in the index-matched fluid; and projecting a first beam of collimated light along a first direction through the photomask and into the interior volume of the mold.

In one embodiment, the first portion of the mold comprises, as a major component, a material selected from the group consisting of glass, long-fiber reinforced plastic, and combinations thereof.

In one embodiment, the first portion of the mold surrounds a major part of the interior volume of the mold.

In one embodiment, the method includes a sealing closure.

In one embodiment, the first portion of the mold includes, as a major component, a material selected from the group consisting of polyethylene terephthalate, polyethylene terephthalate glycol-modified, polyvinyl chloride, poly(methyl methacrylate), polyethylene, glass, and combinations thereof.

In one embodiment, the mold further includes a second portion, and wherein the first portion surrounds a minor part of the interior volume of the mold.

In one embodiment, the first portion includes a sealing surface, and the second portion includes a sealing surface; the sealing surface of the first portion configured to form a seal with the sealing surface of the second portion.

In one embodiment, the mold further includes a resin in port.

In one embodiment, the mold further includes a resin out port.

In one embodiment, the sealing surface of the first portion bisects both the resin in port and the resin out port.

In one embodiment, the first portion includes, as a major component, a material index of refraction matched with the photomonomer resin, the material being selected from the group consisting of thermoplastics, thermoset materials, glasses, and filled plastics.

In one embodiment, the first portion comprises, as a major component, a material selected from the group consisting of glass, long-fiber reinforced plastic, and combinations thereof.

In one embodiment, the assembling of the reservoir, the mold, the volume of the photomonomer resin, the volume of the index-matched fluid, and the photomask includes placing the mold in the reservoir with the first portion above the second portion.

In one embodiment, the index-matched fluid is index of refraction matched with the index-matched mold material to have the difference between the index of refraction of the index-matched fluid and the index of refraction of the index-matched mold material to be less than 10% of the index of refraction of the index-matched mold material, and the index-matched mold material is index of refraction matched with the photomonomer resin to have the difference between the index of refraction of the index-matched mold material and the index of refraction of the photomonomer resin to be less than 10% of the index of refraction of the photomonomer resin.

In one embodiment, the assembling of the reservoir, the mold, the volume of the photomonomer resin, the volume of the index-matched fluid, and the photomask includes fabricating the first portion of the mold by vacuum-forming.

In one embodiment, the method includes applying a coating of mold release to an interior surface of the first portion of the mold.

In one embodiment, the method includes subjecting an interior surface of the first portion of the mold to an adhesion-promoting treatment.

In one embodiment, the adhesion-promoting treatment includes applying a solution of sodium hypochlorite to the interior surface of the first portion of the mold.

In one embodiment, the method includes clamping together the first portion of the mold and the second portion of the mold.

In one embodiment, the method includes: projecting a second beam of collimated light along a second direction through the photomask and into the interior volume of the mold; projecting a third beam of collimated light along a third direction through the photomask and into the interior volume of the mold; and forming a micro-truss in the interior volume of the mold.

In one embodiment, the forming of the micro-truss includes: forming a plurality of first truss elements defined by a plurality of first self-propagating polymer waveguides and extending along the first direction; forming a plurality of second truss elements defined by a plurality of second self-propagating polymer waveguides and extending along the second direction; and forming a plurality of third truss elements defined by a plurality of third self-propagating polymer waveguides and extending along the third direction.

In one embodiment, the mold includes a wall that the first beam of collimated light is projected through to reach the interior volume of the mold, the first beam of collimated light entering the wall at a first entry location having a first normal direction and exiting the wall at a first exit location having a second normal direction, the first normal direction and the second normal direction being different.

In one embodiment, the method includes: projecting a second beam of collimated light along a second direction through the photomask and into the interior volume of the mold, wherein the first beam of collimated light is projected through a first entry location having a first normal direction, and the second beam of collimated light is projected through a second entry location having a second normal direction, the first normal direction and the second normal direction being different.

In one embodiment, the mold includes an exterior curved surface, and the first entry location and the second entry location are each disposed on the exterior curved surface.

According to an embodiment of the present invention there is provided a system for fabricating a micro-truss object, the system including: a mold enclosing a volume of photomonomer resin; the mold including a portion index of refraction matched with the photomonomer resin, a reservoir containing a volume of index-matched fluid index of refraction matched with the photomonomer resin; a photomask, and a source of collimated light; the mold being at least partially submerged in the index-matched fluid, the source of collimated light being positioned to illuminate the photomonomer resin through the photomask.

According to an embodiment of the present invention there is provided a micro-truss object, including: a container including a material index of refraction matched with a photomonomer resin, and a micro-truss structure, including a photopolymer of the photomonomer resin, the micro-truss structure filling an interior volume of the container.

In one embodiment, the container surrounds a major part of the interior volume of the container; the container has an opening; a diameter of the opening is less than a unit cell size of the micro-truss structure; and the container includes, as a major component, a material selected from the group consisting of glass, long-fiber reinforced plastic, and combinations thereof.

BRIEF DESCRIPTION OF THE DRAWINGS

These and other features and advantages of the present invention will be appreciated and understood with reference to the specification, claims and appended drawings wherein:

DETAILED DESCRIPTION

The detailed description set forth below in connection with the appended drawings is intended as a description of exemplary embodiments of a method and/or system for fabricating dual curvature micro-truss structures provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1A:
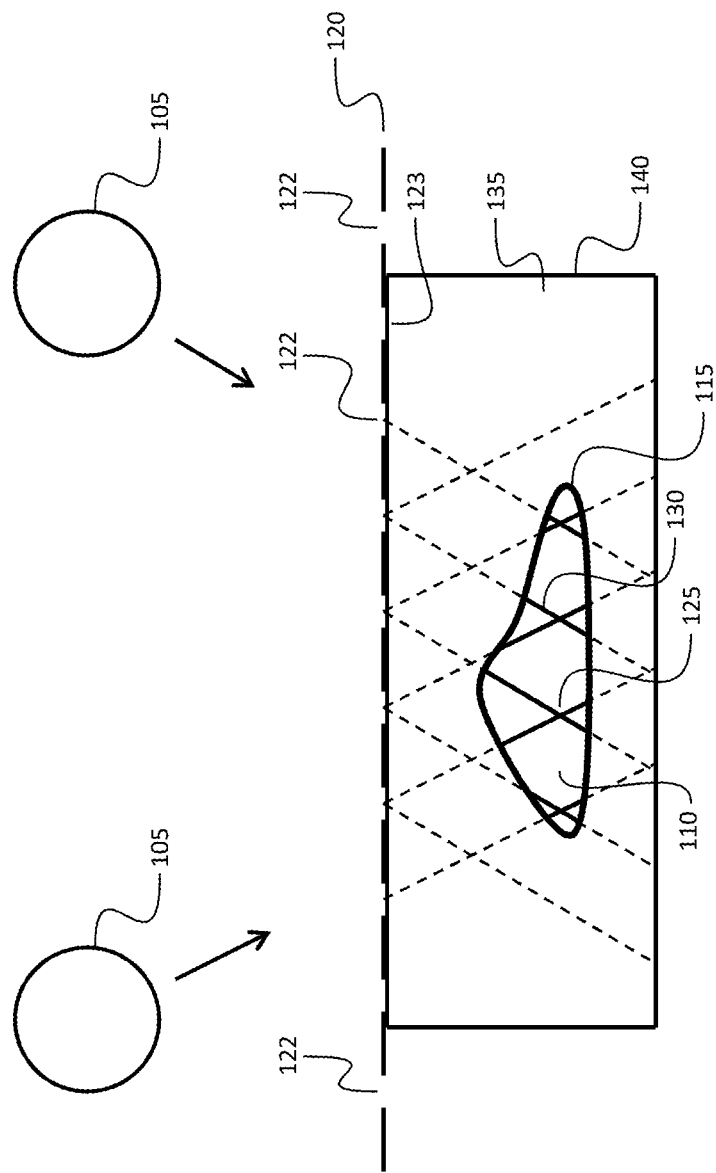
FIG. 1A is a schematic diagram of a system for forming a micro-truss structure according to an embodiment of the present invention.

Referring to FIG. 1A, in one embodiment a micro-truss object is formed by illuminating, with collimated light e.g., ultraviolet (UV) light from sources 105, a volume of photopolymerizable resin or "photomonomer resin" 110 in a hollow mold 115, through a photomask 120 having a plurality of apertures 122. The photomonomer resin may be a solution of a suitable monomer and a photoinitiator. As a result of this illumination, a micro-truss structure forms inside the mold 115 by a self-guided, or "self-propagating" photo-polymerization process, as described in the '989 patent and in the '959 patent. Photopolymers may undergo a refractive index change during the polymerization process, which can lead to the formation of polymer optical waveguides. If a photomonomer resin 110 that is photo-sensitive is exposed to light (e.g., UV light) under the right conditions, the initial area of polymerization, such as a small circular area, will "trap" the light and guide it to the tip of the polymerized region, further advancing that polymerized region. This process will continue, leading to the formation of a waveguide structure with approximately or about the same cross-sectional dimensions along its entire length. The waveguides may interpenetrate at nodes 125, resulting in a micro-truss structure including micro-truss members 130 joined at the nodes 125. In one embodiment the nodes 125 are not perturbed dimensionally by the change in index of refraction resulting from the photo-polymerization process, i.e., the nodes do not swell up, or have a local diameter exceeding the diameter of the micro-truss members 130 that meet at the nodes 125. Three or more sources of collimated light may be utilized, illuminating the photomonomer resin 110 from three or more different directions, to form waveguides extending along three different directions. The sources of collimated light may be activated simultaneously (i.e., at about the same time), to form the micro-truss structure in a single exposure, or only a subset may be activated at any time, so that the micro-truss structure is formed over multiple exposures.

In one embodiment, the mold 115, or, if the mold is composed of several pieces or "portions" that are assembled to form the mold 115, at least a portion of the mold 115, which is uppermost during the exposure to collimated light, transparent to the light (e.g., UV light) utilized to illuminate the photomonomer resin 110, and the transparent portion is index-matched (i.e., index of refraction matched) to the photomonomer resin 110, e.g., a material with a refractive index close to (e.g., within 10% of) that of the photomonomer resin 110, is selected for this portion of the mold 115. The mold 115 is immersed in an index-matched fluid 135 the index of refraction of which is matched to the index-matched material of the mold 115, contained in reservoir 140, and the photomask 120 is supported on, and substantially in contact with, the upper surface of the index-matched fluid 135. In one embodiment the index-matched fluid 135 is not a photomonomer resin; it may be, for example, a monomer resin without a photoinitiator. If the indices of refraction of the index-matched fluid 135, the walls of the mold 115, and the photomonomer resin 110 are all similar, then beams of light projected through the apertures 122 propagate in substantially straight lines after entering the index-matched fluid 135, forming parallel beams through the photomonomer resin 110, and, accordingly, parallel micro-truss members 130. This process makes it possible to fabricate micro-truss objects having both an upper surface and a lower surface that are curved, without, for example first fabricating two objects each with one flat surface and one curved surface, and bonding them together at their respective flat surfaces.

Figure 1B:
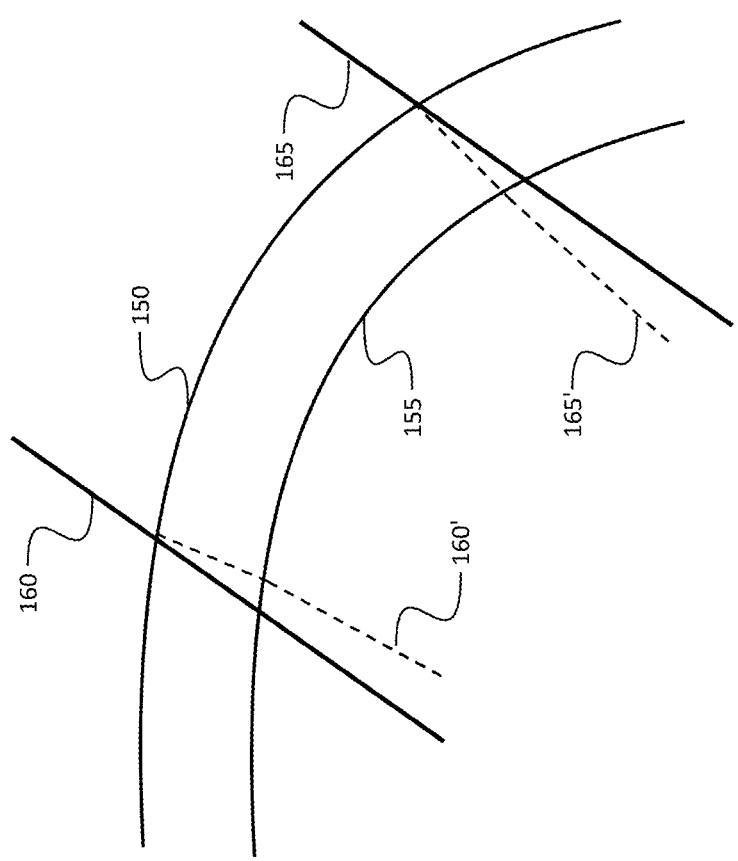
FIG. 1B is a schematic diagram showing beams propagating through a curved mold wall, according to an embodiment of the present invention.

Referring to FIG. 1B, if the index of refraction match is poor at either the interface between the index-matched fluid 135 and the index-matched portion of the mold, or between the index-matched portion of the mold and the photomonomer resin 110, and if either of these interfaces has different angles of incidence for different parallel beams of light, then the beams of light formed by the photomask 120 may refract at different angles, and beams that are formed to be parallel at the photomask 120 may cease to be parallel after propagating through the interface. This loss of parallelism may result in the failure to form a micro-truss structure inside the mold 115. Different angles of incidence may occur because a mold surface is curved around one or more axes, has flat surfaces with different angles, is pitted, faceted, ridged, or is otherwise not a single flat surface. In addition, a mold wall may have varying thickness and/or internal and external surfaces that are nonparallel. For example, in FIG. 1B, the curvature of the exterior surface 150 of the mold wall and of the interior surface 155 of the mold wall does not affect the direction of propagation of a first beam 160 and a second beam 165 if the indices of refraction are matched at both interfaces 150, 155. On the other hand, if the indices of refraction are not matched at one or both interfaces 150, 155, then the direction of one or both of the beams 160, 165 may change, e.g. to follow the paths 160', 165' that are not parallel in the interior volume of the mold.

In one embodiment, the mold 115 is fully submerged during the exposure to collimated light. In other embodiments, portions of the mold 115 (e.g., support brackets or mold edges) that do not contain photomonomer resin 110, or that contain photomonomer resin 110 but are masked off from the collimated light (and, e.g., exposed during a separate, subsequent or preceding, exposure to collimated light) are not submerged during the exposure to collimated light.

In one embodiment, the photomask 120 is substantially in contact with the upper surface of the index-matched fluid 135. This is accomplished by slightly over-filling the reservoir 140 so that the index-matched fluid 135 forms a convex meniscus. The photomask 120 is then placed on the upper surface of the fluid and lowered until it rests on the edges of the reservoir. In one embodiment the photomask 120 consists of a thin, plastic, e.g., polyester, film, printed with a pattern, secured to a sheet of glass; in another embodiment, the photomask 120 consists of two sheets of glass and a plastic film, printed with a pattern, sandwiched between them. Having the photomask 120 substantially in contact with the upper surface of the index-matched fluid 135 prevents the beams of collimated light from reflecting from the surfaces of the air gap that may otherwise exist between the photomask 120 and the index-matched fluid 135, producing undesired additional stray beams of light. In one embodiment a fill port is provided in a wall of the reservoir for adding index-matched fluid 135 after the photomask 120 is in place, to bring the index-matched fluid 135 into contact with the photomask 120.

For example, the index-matched fluid 135 may be pentaerythritol tetrakis (3-mercaptopropionate) (PTMP) with an index of refraction of 1.53, the mold 115 may be composed of glass with an index of refraction of 1.5 or of PET with an index of refraction of 1.575, and the photomonomer resin 110 may have an index of refraction of 1.52, forming a photopolymer with an index of refraction of 1.56. The resulting micro-truss structure fills the mold 115, forming a micro-truss object with a shape conforming to the shape of the interior of the mold 115.

Figure 2:
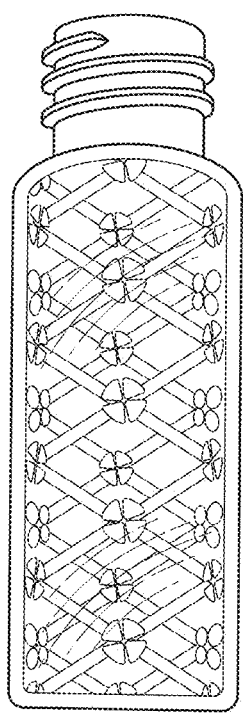
FIG. 2 is a photograph of a micro-truss fabricated in a mold according to an embodiment of the present invention.
Figure 3:
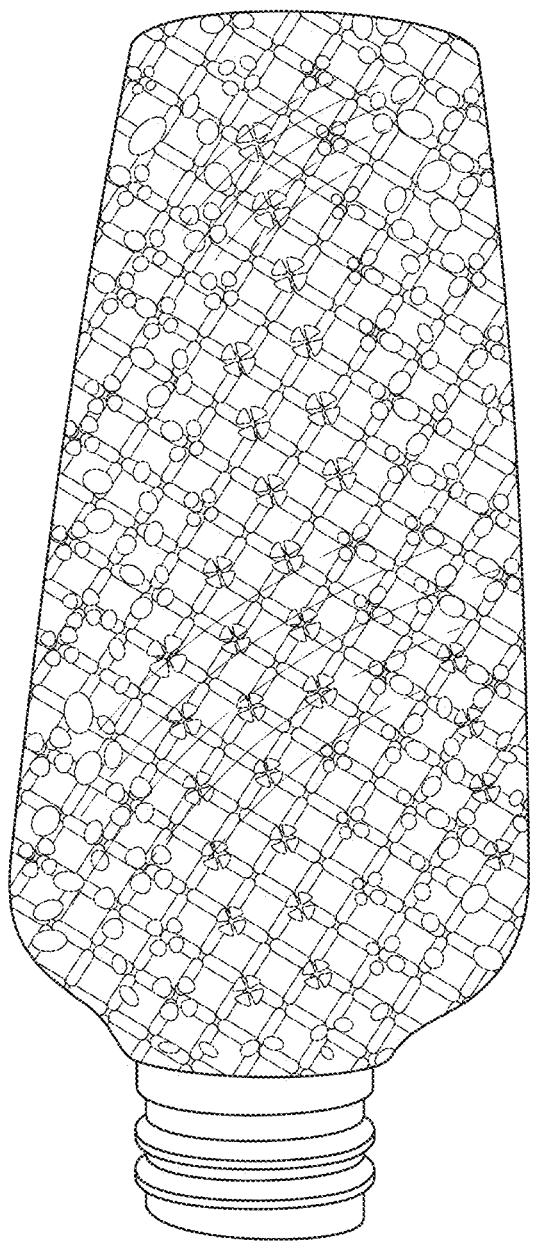
FIG. 3 is a photograph of a micro-truss fabricated in a mold according to another embodiment of the present invention.
Figure 4:
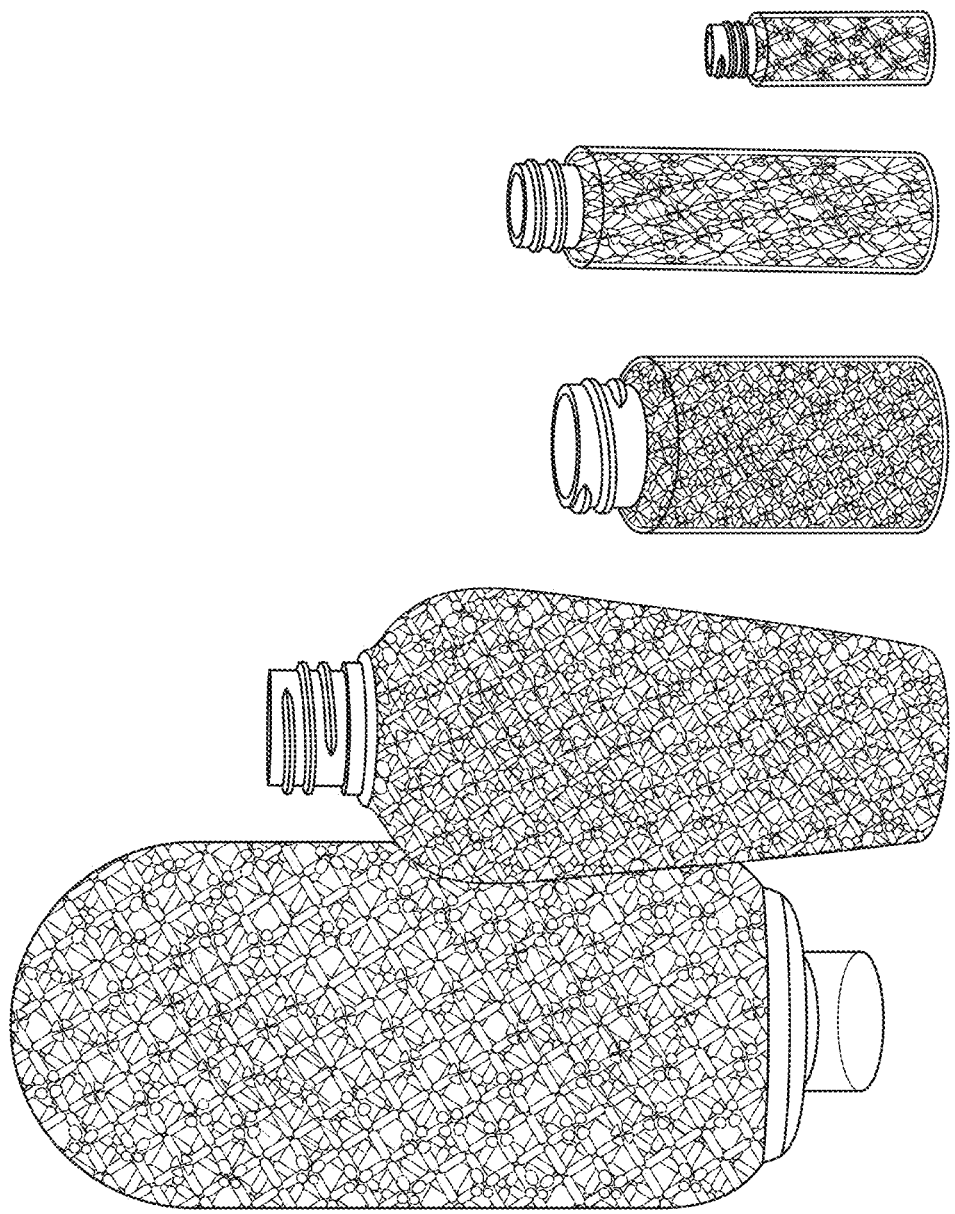
FIG. 4 is a photograph of a micro-truss fabricated in a variety of molds according to other embodiments of the present invention.

In one embodiment, the mold is a container, such as a bottle, made of a transparent, material such as glass or transparent plastic, e.g., polyethylene terephthalate (PET), index of refraction matched with the photomonomer resin 110. The container is filled with photomonomer resin 110, and sealed, e.g., by covering the mouth of the bottle with a sealing closure such as a cap. The container is then immersed in the index-matched fluid 135, and illuminated through the photomask 120, to form a micro-truss structure filling the interior of the bottle, the wall of the bottle forming a face sheet surrounding most of the micro-truss structure. In this embodiment the mold surrounds a major portion of the photomonomer resin 110, and, consequently, it surrounds a major portion of the micro-truss structure after it is formed so that after formation the micro-truss structure is captive in the mold. The resulting object may be put to use in this configuration, or if a structure without a face sheet is desired, the bottle may be removed by a suitable process, e.g., by breaking it, or cutting it away. FIGS. 2, 3, and 4 are photographs of micro-truss structures formed in bottles using a process according to this embodiment.

The "bottle" method, unlike a method utilizing a two-portion mold, such as that of the embodiment described below, is that the bottle method enables structures to be fabricated which are not readily made via three-dimensional (3-D) printing technologies. The bottle method utilizes a preformed container, whose only requirements are UV transparency at the initiation wavelength of a photoinitiator which may be a component of the photomonomer resin 110, and an opening through which the photomonomer resin 110 may be filled or removed. Candidate mold materials for the bottle method include glass, which is not readily 3-D printed, or a composite material. In one embodiment the bottle and mask are selected so that the opening in the bottle is on the size scale of the representative unit cell of the micro-truss structure.

Figure 5:
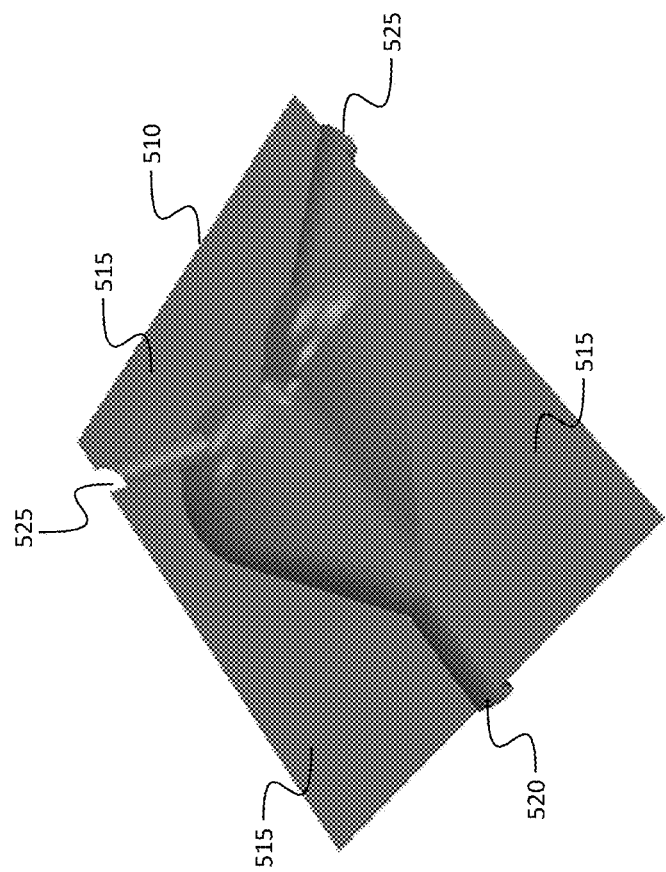
FIG. 5 is a portion of a mold according to an embodiment of the present invention.
Figure 6A:
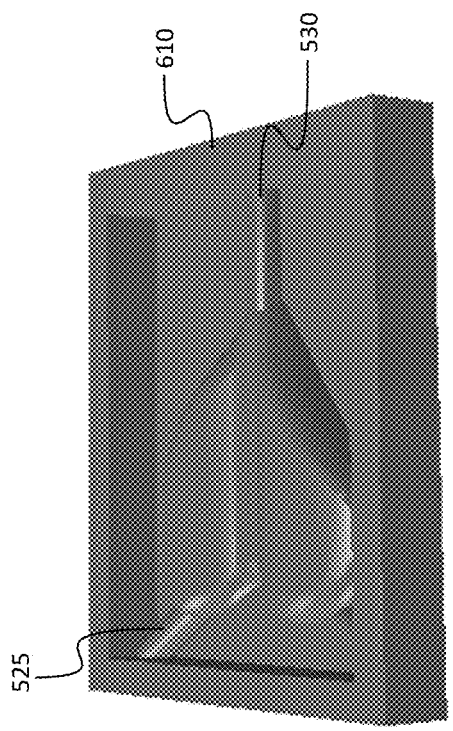
FIG. 6A shows a first view of a mold including two portions clamped together according to an embodiment of the present invention.
Figure 6B:
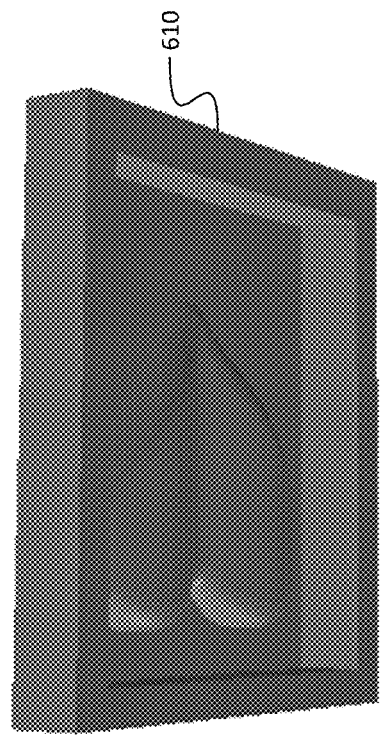
FIG. 6B shows a second view of a mold including two portions clamped together according to the embodiment of FIG. 6A.

Referring to FIG. 5, in another embodiment, a mold is formed of two or more portions 510 that can be assembled to seal together. Each portion has a sealing surface 515 for forming a seal against one or more other portions 510. When assembled, the two portions 510 may be clamped together. For example, a first portion 510 in the shape shown in FIG. 5, and a second portion that is substantially a mirror image of the first portion 510, may be clamped between two clamping frames 610, as shown in FIGS. 6A and 6B. The mold is then filled with photomonomer resin 110 and illuminated through the photomask 120, while immersed in the index-matched fluid 135. One or more of the portions 510 may enclose only a minor portion of the interior volume of the mold, so that when a micro-truss structure is formed in the mold it is not captive in that portion 510 of the mold, as it would be if the mold portion were to wrap entirely around the interior volume, the way a bottle does. In this case, if the micro-truss structure does not adhere to the interior surface of the portion 510 of the mold, e.g., as a result of mold release having been applied to this interior surface, then it may be possible simply pull the formed micro-truss object out of the portion of the mold. Any suitable mold release agent, such as SPRAYON™ MR314, or another lecithin-based mold release agent, may be employed for this purpose.

Alternatively, one or more portions 510 may be composed of materials selected, or treated, to adhere to the micro-truss structure, so that after fabrication part or all of that portion may be left attached to the micro-truss structure to form a face sheet covering all or a portion of the micro-truss structure. In one embodiment, a coating of liquid bleach, e.g., sodium hypochlorite, is applied to the interior surface of a portion 510 to promote adhesion, e.g., by causing roughening of the interior surface.

In general, an essentially arbitrary combination of portions 510 is possible, provided that at least one portion 510 (or a sufficiently large part of one portion to allow the collimated light to illuminate the photomonomer resin 110) is transparent and index of refraction matched with the photomonomer resin 110. Each portion may be selected from a variety of candidate materials, and each portion may be treated to promote adhesion, coated with mold release, or left untreated prior to the mold being filled with photomonomer resin 110. Candidate materials include metals, thermoplastics, and thermoset plastics, and more particularly, acrylic, PET, and photopolymers. A metal portion 510 may be formed, for example, by stamping or spinning. A thermoplastic portion 510 may be formed by vacuum forming over a suitable plug; the plug may be fabricated, for example, by three-dimensional (3-D) printing. Any portion of the mold through which the collimated light does not propagate before illuminating the photomonomer resin 110 need not have good optical qualities and may be composed of an opaque material such as metal, or it may be formed by 3-D printing, and it may have variable or substantial thickness. In one embodiment a portion 510 is composed of the same photopolymer that forms when the photomonomer resin 110 is illuminated. In one embodiment, a face sheet is fabricated so as to conform to the interior surface of a portion 510 of the mold, and inserted in the mold prior to filling of the mold with photomonomer resin 110. The micro-truss structure then forms in the mold, adhering to the face sheet, and the micro-truss object, complete with the face sheet, may be removed from the mold after the exposure to collimated light is complete. The mold portion 510 may then be re-used to form additional micro-truss objects.

In one embodiment a metal mold portion has an interior surface that has been treated to reduce or eliminate specular reflections, or all reflections, of the collimated light, which otherwise may cause unwanted waveguides to form in the mold. This surface treatment may include, for example, scuffing the surface, coating it with a non-reflective opaque coating such as paint, or anodizing it.

In one embodiment, a mold portion is fabricated of a material not suitable for 3-D printing, such as glass or a long-fiber reinforced material (as distinct from material reinforced with chopped fibers), e.g., fiberglass reinforced plastic reinforced with fiberglass weave, such as G10, which is ultraviolet transparent, or carbon-fiber reinforced plastic reinforced with carbon fiber weave. As used herein, "long-fiber reinforced plastic" refers to plastic reinforced with fibers a plurality of which are at least 1 cm long. In other embodiments a mold portion is formed of another composite material such as a filled plastic, e.g., a plastic filled with carbon black or with glass spheres.

For example, a mold may be composed of two transparent portions 510 index of refraction matched with the photomonomer resin 110, one of which is coated with mold release and one of which is treated to promote adhesion, so that the micro-truss object, once formed, has a transparent face sheet over a portion of its surface and no face sheet over another portion of its surface. In another example, a mold may be composed of one metal portion 510 and one transparent portion 510 index of refraction matched with the photomonomer resin 110, both treated to promote adhesion, and the micro-truss object, once formed, has a transparent face sheet over a portion of its surface and a metal face sheet over another portion of its surface.

Figure 7:
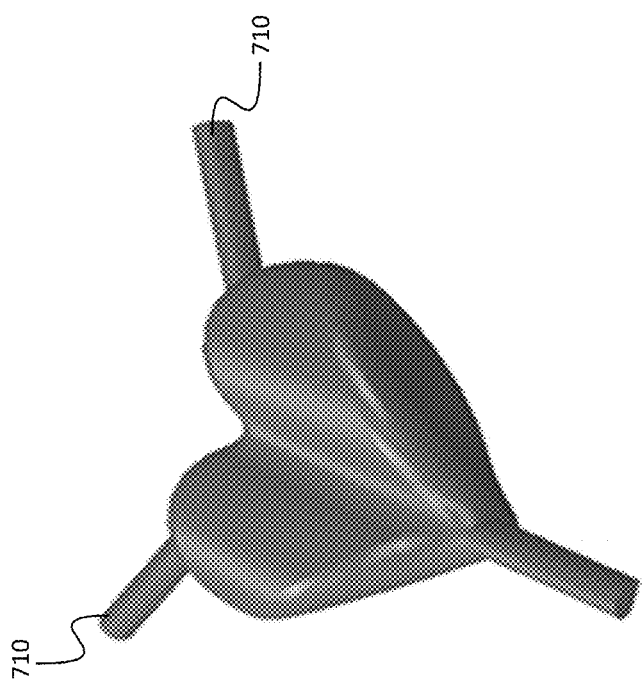
FIG. 7 shows an exterior surface of a micro-truss structure fabricated according to an embodiment of the present invention.
Figures 8A, 8B, 8C:
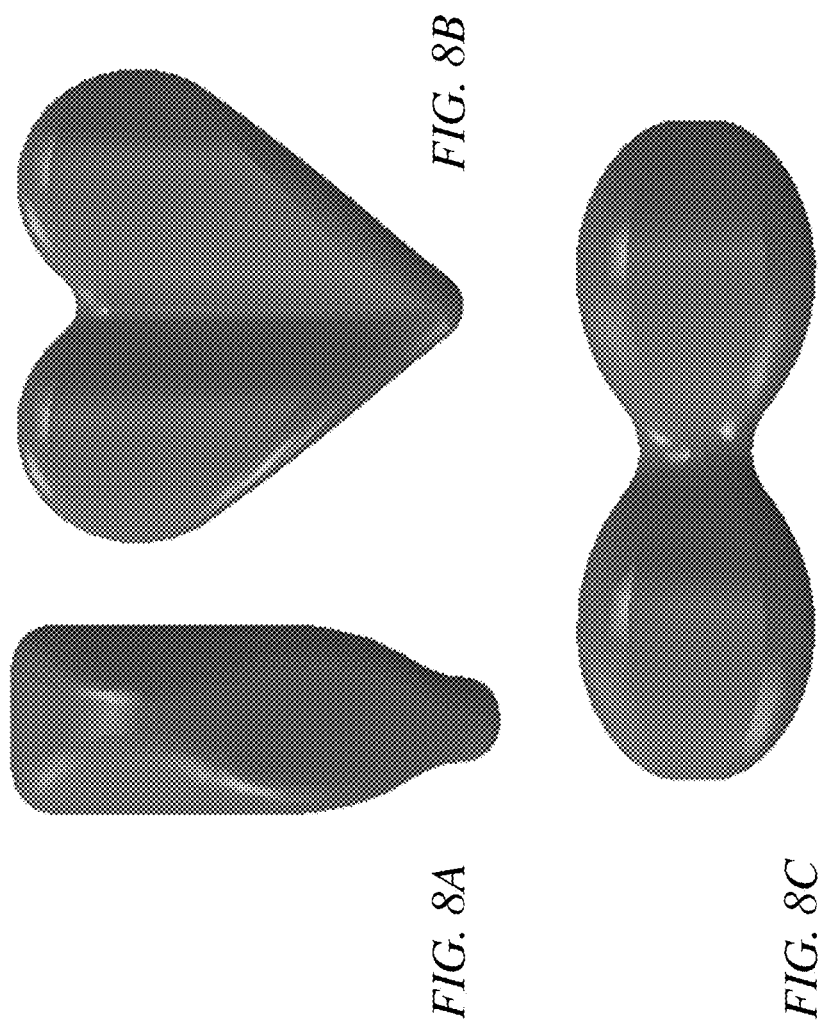
FIG. 8A shows a side view of an exterior surface of a micro-truss structure fabricated according to an embodiment of the present invention.
FIG. 8B shows a front view of an exterior surface of a micro-truss structure fabricated according to an embodiment of the present invention.
FIG. 8C shows a top view of an exterior surface of a micro-truss structure fabricated according to an embodiment of the present invention.

One or more resin in ports 520 may be provided in the mold for filling the mold with photomonomer resin 110, and one or more resin out ports 525 may be provided for allowing air to escape while the mold is filled. During filling, the mold may be oriented so that the resin in ports are at the bottom of the mold, and the resin out ports are at the top of the mold, to avoid trapping air bubbles in the mold. The mold may be filled while in the reservoir and/or while submerged in the index-matched fluid 135 if hoses are provided for supplying the photomonomer resin 110 and for carrying away the air displaced during filling. In another embodiment the mold is first filled and then placed in the index-matched fluid 135, which is index of refraction matched with the mold. The ports 520, 525 may be bisected, as shown in FIG. 5, by a sealing surface 515 or sealing surfaces 515, to facilitate separation of the portions 510 after formation of the micro-truss structure, which may extend into the ports, and which could be captured in a port 520, 525, if the port 520, 525 is not bisected by a sealing surface. FIG. 7 shows the outer surface of a micro-truss object that may be formed with the mold of FIGS. 5, 6A, and 6B (the individual micro-truss members 130 and nodes 125 are not visible in FIG. 7). In the object of FIG. 7, the micro-truss structure has been formed so as to extend into the ports 520, 525, forming tabs 710 that may be trimmed after the micro-truss object is removed from the mold. The outer surface of a micro-truss object that may be fabricated using the mold of FIGS. 6A and 6B is shown in FIGS. 8A (side view), 8B (front view) and 8C (top view). The object of FIGS. 8A, 8B, and 8C lacks tabs 710; this may be a result of any tabs that may have formed having been trimmed off, or a result of the illumination with collimated light having been confined so as not to illuminate any photomonomer resin 110 in the ports 520, 525.

In one embodiment, one or more portions 510 are left adhered to the micro-truss structure after it is formed, and the sealing surfaces 515 may be trimmed away after formation, leaving a micro-truss object partially or wholly covered in face sheets composed of the remaining mold wall (or wall of the mold portion 510). For thin walled, hollow structures, incorporating the micro-truss material inside may improve the properties, both in compression and in tension. In one embodiment, the mold is a thin-walled transparent tube, e.g., a tube composed of transparent plastic index of refraction matched with the photomonomer resin 110, and the micro-truss structure formed inside the tube provides rigidity at a low weight cost, resulting in a tube that may be stronger axially compared to a thicker walled tube with the same total weight, and capable of being utilized in applications in which a metal tube may not be suitable.

Figure 9:
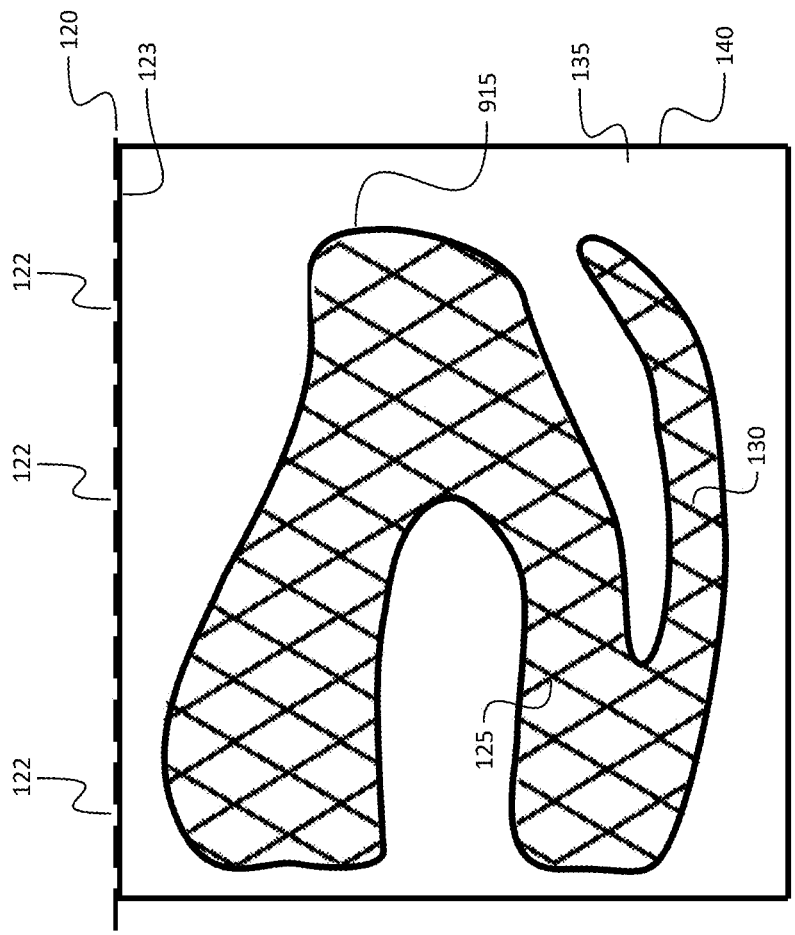
FIG. 9 is a schematic diagram of a system for forming a convoluted micro-truss structure according to an embodiment of the present invention.

Referring to FIG. 9, in one embodiment a micro-truss structure can be formed in an essentially arbitrary shape, provided a suitable mold is available. The light forming the micro-truss members 130 and nodes 125 may, for example, enter the mold 915, propagate through the photomonomer resin 110 forming a waveguide, exit the mold, propagate through the index-matched fluid 135, and then enter the mold again, forming an additional waveguide. Paths of this sort may enter, exit, and re-enter the mold an arbitrary number of times provided the intensity of the collimated light remains sufficient to continue to form waveguides. Micro-truss objects may be formed with non-constant cross-sectional thickness, or with complex curvature utilizing a mold the inner surfaces of which are not flat or parallel to the photomask 120. Sandwich structures including micro-truss structures between face sheets may be formed.

Figure 10:
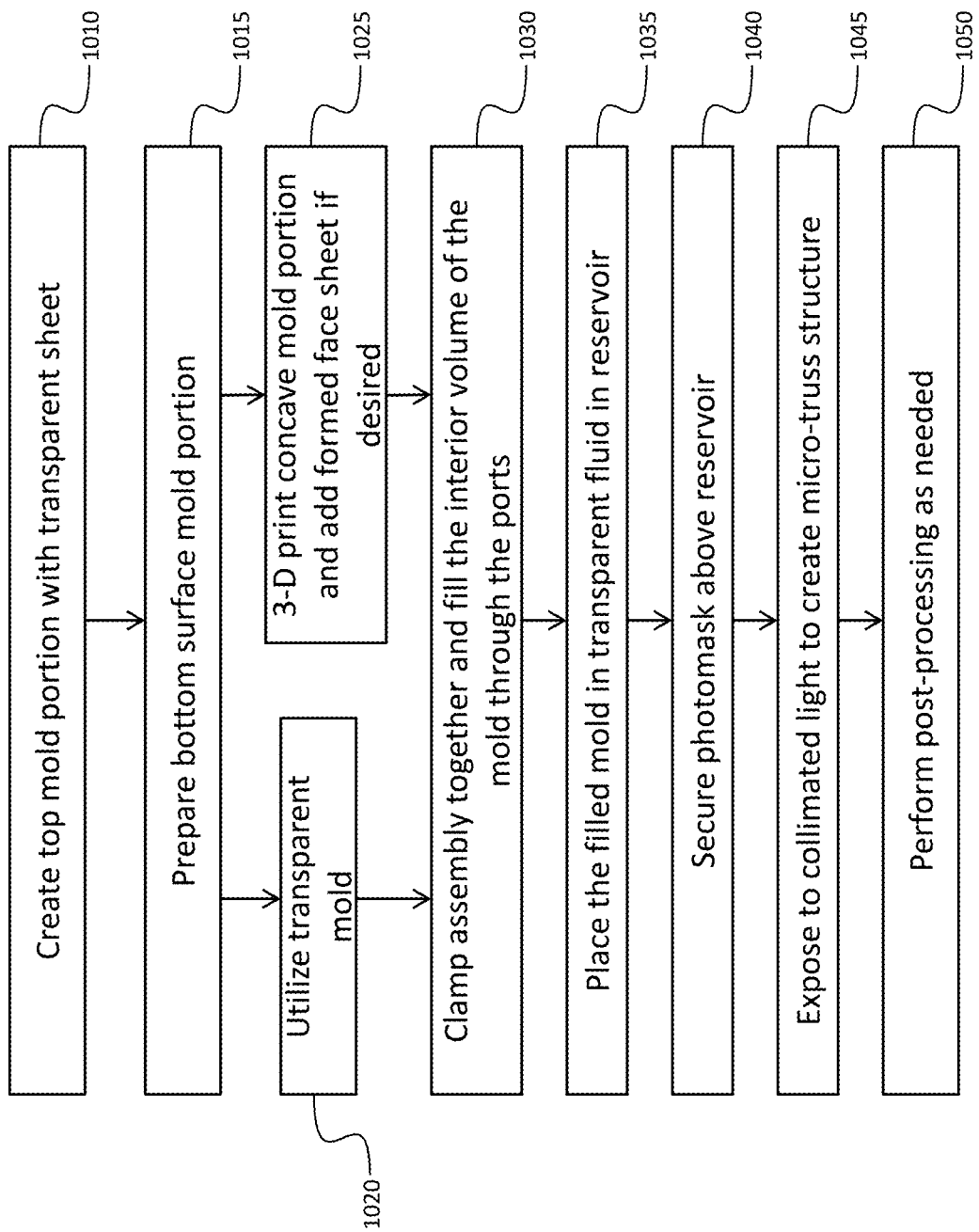
FIG. 10 is a flow chart of a method for forming a micro-truss structure according to an embodiment of the present invention.

Referring to FIG. 10, in one embodiment a method for forming a micro-truss object proceeds as follows. In an act 1010, a top mold portion is created from a transparent sheet, e.g., by vacuum forming. In acts 1015, 1020, and 1025, a bottom mold portion is formed either by utilizing another transparent mold portion (in act 1020) or by (in an act 1025) 3-D printing a concave bottom mold portion and adding a formed face sheet to the interior surface of the bottom mold portion. In an act 1030, the top and bottom mold portions 510 are clamped together and filled through ports 520, 525, and, in an act 1035, the filled mold is placed in index-matched fluid 135 in a reservoir. In one embodiment the photomonomer resin 110, the index-matched mold portion, and the index-matched fluid have indices of refraction that are all similar, e.g., the index of refraction of the index-matched fluid 135 and the index of refraction of the index-matched mold portion differ by less than 10%, and the index of refraction of the index-matched mold portion and the index of refraction of the photomonomer resin differ by less than 10%. In an act 1040, a photomask 120 is secured above the reservoir, and the contents of the reservoir are exposed, in an act 1045, to collimated light, to form a micro-truss structure in the mold. In an act 1050, post-processing is then performed as needed, e.g., removing the micro-truss structure from one or both portions 510 of the mold, trimming away the sealing surface 515 from any mold portion 510 adhered to the micro-truss structure, or trimming away any tabs 710 that may have formed.

Figure 11:
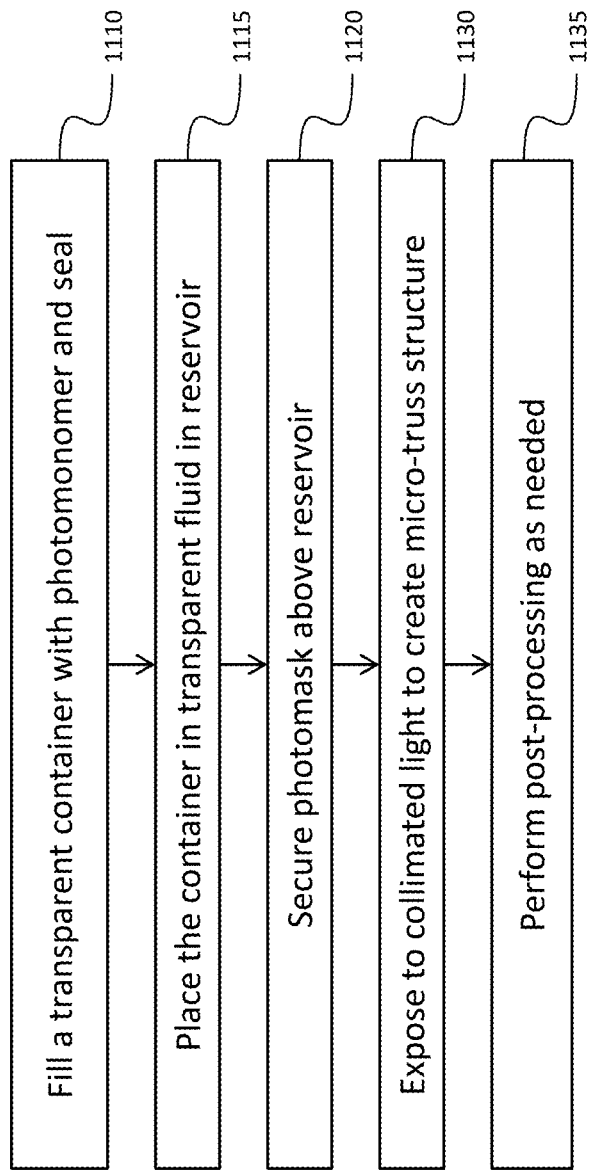
FIG. 11 is a flow chart of a method for forming a micro-truss structure according to another embodiment of the present invention.

Referring to FIG. 11, in one embodiment a method for forming a micro-truss object using a "bottle" method proceeds as follows. In an act 1110 a transparent container or bottle, to be used as the mold is filled with photomonomer resin 110 and sealed with a sealing closure such as a cap. In an act 1115, the container is placed in index-matched fluid 135 in a reservoir. In an act 1120, a photomask 120 is secured above the reservoir, and the contents of the reservoir are exposed, in an act 1130, to collimated light, to form a micro-truss structure in the mold. In an act 1135, post-processing is then performed as needed, e.g., breaking or cutting away the mold to extract the micro-truss structure formed in its interior volume.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the term "substantially," "about," and similar terms are used as terms of approximation and not as terms of degree, and are intended to account for the inherent deviations in measured or calculated values that would be recognized by those of ordinary skill in the art. As used herein, the term "major component" means a component constituting at least half, by weight, of a composition, and the term "major portion", when applied to a plurality of items means at least half of the items.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of present invention." Also, the term "exemplary" is intended to refer to an example or illustration.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on," "directly connected to", "directly coupled to", or "immediately adjacent to" another element or layer, there are no intervening elements or layers present.

As used herein a "transparent" material is capable of transmitting the light utilized to cure the photomonomer resin 110, and the transparent material may be partially transparent, translucent, or highly transparent.

Although exemplary embodiments of a method for fabricating dual curvature micro-truss structures have been specifically described and illustrated herein, many modifications and variations will be apparent to those skilled in the art. Accordingly, it is to be understood that a method for fabricating dual curvature micro-truss structures constructed according to principles of this invention may be embodied other than as specifically described herein. The invention is also defined in the following claims, and equivalents thereof.

What is claimed is:

1. A system for fabricating a micro-truss object, the system comprising:
   a mold enclosing a volume of photomonomer resin, the mold comprising a portion index of refraction matched with the photomonomer resin,
   a reservoir containing a volume of index-matched fluid index of refraction matched with the photomonomer resin;
   a source of collimated light; and
   a photomask positioned between an upper surface of the index-matched fluid and the source of collimated light,
   the mold being at least partially submerged in the index-matched fluid, and
   the source of collimated light being positioned to illuminate the photomonomer resin through the photomask.

2. The system of claim 1, wherein the portion of the mold comprises, as a major component, a material selected from the group consisting of glass, long-fiber reinforced plastic, and combinations thereof.

3. The system of claim 1, wherein the portion of the mold surrounds a major part of an interior volume of the mold.

4. The system of claim 3, wherein the portion of the mold is a first portion of the mold and the mold further comprises a second portion, the second portion comprising a sealing closure.

5. The system of claim 4, wherein the first portion of the mold comprises, as a major component, a material selected from the group consisting of polyethylene terephthalate, polyethylene terephthalate glycol-modified, polyvinyl chloride, poly(methyl methacrylate), polyethylene, glass, and combinations thereof.

6. The system of claim 1, wherein the portion of the mold is a first portion of the mold, and the mold further comprises a second portion, and
   wherein the first portion surrounds a minor part of an interior volume of the mold.

7. The system of claim 6, wherein the first portion comprises a sealing surface, and the second portion comprises a sealing surface, the sealing surface of the first portion being configured to form a seal with the sealing surface of the second portion.

8. The system of claim 7, wherein the mold further comprises a resin in port.

9. The system of claim 8, wherein the mold further comprises a resin out port.

10. The system of claim 9, wherein the sealing surface of the first portion bisects both the resin in port and the resin out port.

11. The system of claim 6, wherein the first portion comprises, as a major component, a material index of refraction matched with the photomonomer resin, the material being selected from the group consisting of thermoplastics, thermoset materials, glasses, and filled plastics.

12. The system of claim 11, wherein:
   the index-matched fluid is index of refraction matched with the index-matched mold material to have the difference between the index of refraction of the index-matched fluid and the index of refraction of the index-matched mold material to be less than 10% of the index of refraction of the index-matched mold material, and
   the index-matched mold material is index of refraction matched with the photomonomer resin to have the difference between the index of refraction of the index-matched mold material and the index of refraction of the photomonomer resin to be less than 10% of the index of refraction of the photomonomer resin.

13. The system of claim 1, wherein a micro-truss structure is filled in an interior volume of the mold and comprises:
- a plurality of first truss elements defined by a plurality of first self-propagating polymer waveguides and extending along a first direction;
- a plurality of second truss elements defined by a plurality of second self-propagating polymer waveguides and extending along a second direction differing from the first direction; and
- a plurality of third truss elements defined by a plurality of third self-propagating polymer waveguides and extending along a third direction differing from each of the first direction and the second direction.

14. The system of claim 1, wherein the mold includes a wall that a beam of collimated light is projected through to reach an interior volume of the mold, the beam of collimated light entering the wall at a first entry location having a first normal direction and exiting the wall at a first exit location having a second normal direction, the first normal direction and the second normal direction being different.

15. The system of claim 14, wherein the mold includes an exterior curved surface, and
- wherein the first entry location and the first exit location are each disposed on the exterior curved surface.

16. The system of claim 1, wherein the photomask is directly on the upper surface of the index-matched fluid.

* * * * *